(12) United States Patent
Reust (10) Patent No.: US 11,346,966 B2
(45) Date of Patent: May 31, 2022

(54) SYSTEM AND METHOD TO TRANSFER INERTIAL MASS

(71) Applicant: Dennis Keith Reust, Stillwater, OK (US)

(72) Inventor: Dennis Keith Reust, Stillwater, OK (US)

( * ) Notice: Subject to any disclaimer, the term of this patent is extended or adjusted under 35 U.S.C. 154(b) by 0 days.

(21) Appl. No.: 17/213,973

(22) Filed: Mar. 26, 2021

(65) Prior Publication Data

US 2021/0396896 A1     Dec. 23, 2021

Related U.S. Application Data

(60) Provisional application No. 63/042,847, filed on Jun. 23, 2020, provisional application No. 63/090,915, filed on Oct. 13, 2020.

(51) Int. Cl.
*G01V 1/155* (2006.01)
*G01V 1/133* (2006.01)
*F16F 15/023* (2006.01)
*F16F 15/02* (2006.01)

(52) U.S. Cl.
CPC .............. *G01V 1/155* (2013.01); *G01V 1/133* (2013.01); *F16F 15/022* (2013.01); *F16F 15/023* (2013.01); *F16F 15/0232* (2013.01)

(58) Field of Classification Search
CPC .... F16F 15/022; F16F 15/023; F16F 15/0232; G01V 1/133; G01V 1/155
See application file for complete search history.

(56) References Cited

U.S. PATENT DOCUMENTS

| | | | |
|---|---|---|---|
| 3,023,782 A | 3/1962 | Chaves, Jr. et al. |
| 3,059,483 A | 10/1962 | Clynch et al. |
| 3,126,031 A | 3/1964 | Hayner |
| 3,228,423 A | 1/1966 | Moog, Jr. |
| 3,260,273 A | 7/1966 | Hayner |
| 3,280,935 A | 10/1966 | Brown |
| 3,461,909 A | 8/1969 | Vohringer |

(Continued)

FOREIGN PATENT DOCUMENTS

EP     2600175 A1     5/2013

OTHER PUBLICATIONS

NL-1014077-C2 English Abstract and Drawing (Year: 2001).*

(Continued)

*Primary Examiner* — Melody M Burch
(74) *Attorney, Agent, or Firm* — Robert H. Frantz (57) ABSTRACT

Earth vibrators, such as servo-hydraulic vibrators, are improved to produce more output force and less distortion at very low frequencies by capturing mass from the vehicles which carry them, adding sufficient inertial mass to the reaction mass without adding much vehicle and equipment weight while also avoiding increases to the servo-hydraulic vibrator's stroke length. In particular, improvements to servo-hydraulic vibrators, at low frequencies, will couple some mass from the carrier vehicle frame and its load using non-rigid coupling only when additional mass is needed using dampers connected between the reaction mass and the carrier vehicle's frame, with the added damping being applied by a control system at very low frequencies of output where the vibrator is otherwise unable to produce force equal to its hold-weight.

26 Claims, 4 Drawing Sheets

(56) References Cited

U.S. PATENT DOCUMENTS

| | | | |
|---|---|---|---|
| 3,858,170 A | 12/1974 | Freeman et al. | |
| 4,118,611 A | 10/1978 | Harris | |
| 4,147,228 A * | 4/1979 | Bouyoucos | G01V 1/147 181/119 |
| 4,184,144 A | 1/1980 | Rickenbacker | |
| 4,265,331 A | 5/1981 | Leonard | |
| 4,450,928 A | 5/1984 | Weber et al. | |
| 4,637,002 A | 1/1987 | Sallas | |
| 4,646,274 A | 2/1987 | Martinez | |
| 4,679,591 A | 7/1987 | Maue et al. | |
| 4,682,669 A | 7/1987 | Weber | |
| 4,741,364 A | 5/1988 | Stoss et al. | |
| 4,751,687 A | 6/1988 | Christensen | |
| 4,817,908 A * | 4/1989 | Hanlon | B60N 2/503 248/564 |
| 4,821,246 A * | 4/1989 | Van Kampen | H02K 33/06 367/189 |
| 4,853,907 A * | 8/1989 | Bays | G01V 1/053 367/189 |
| 4,864,546 A | 9/1989 | Russell et al. | |
| 5,128,908 A * | 7/1992 | Reust | G01V 1/155 367/190 |
| 5,166,909 A * | 11/1992 | Cole | G01V 1/053 181/112 |
| 5,396,029 A | 3/1995 | Talke | |
| 5,666,328 A * | 9/1997 | Crowell | G01V 1/047 181/113 |
| 6,053,269 A * | 4/2000 | Patten | B60G 17/0152 180/167 |
| 6,269,733 B1 | 8/2001 | Reust | |
| 8,739,680 B2 | 6/2014 | Reust | |
| 9,651,692 B2 | 5/2017 | Buttin | |
| 2002/0117579 A1* | 8/2002 | Kotoulas | G10K 11/178 244/1 N |
| 2007/0032959 A1 | 2/2007 | Jaulin et al. | |
| 2007/0247970 A1* | 10/2007 | Buttin | G01V 1/047 367/14 |
| 2008/0008040 A1 | 1/2008 | Laycock | |
| 2008/0309910 A1* | 12/2008 | Takahashi | F16F 15/027 355/72 |
| 2021/0132242 A1 | 5/2021 | Sallas | |

OTHER PUBLICATIONS

Stokoe, Kenneth H.; High-Amplitude Mobile Vibrator for Exciting Body and Surface Waves in Soil, Pavement and Structural Systems, retrieved on Mar. 19, 2021 from https://apps.dtic.mil/sti/citations/ADA210130.

PSI Repair Team; "Repairing Hydraulic Servo Valves in Seismic Vibrator Trucks", retrieved from https://www.psi-repair.com on Mar. 10, 2021.

Bourcard et al.; "Low frequency sweep control with Nomad-65, VE464 and CheckSweep"; retrieved on Mar. 26, 2021 from https://www.sercel.com.

Reust, Dennis K.; "Hydraulics Delivers Good Vibrations", Oct. 1, 2013, Hydraulics and Pneumatics.

Terrex Group; "Terrex Services" brochure; retrieved on Mar. 10, 2021 from https://docplayer.net/78855540-Terrex-group-services.html.

Industrial Vehicles International; "Products", retrieved on Mar. 19, 2021 from http://www.indvehicles.com.

Tellier, et al; "Practical solutions for effective vibrator high-frequency generation"; copyright 2015.

Air Lift Co.; "Air Suspension Terminology", retrieved on Jul. 26, 2021 from https://www.airliftcompany.com.

Firestone; "Air Spring Replacement Guide 2020", retrieved on Jul. 26, 2021 from www.firestoneip.com, submitted in part including p. 34 (full catalog exceeds maximum IDS EFS-Web upload size).

Fongue, et al.; "Air spring damper, on the way to exceptional sliding: modeling, development, and optimization of an air spring damper with regard to ride comfort and handling"; 5th Int'l Munich Chassis Symposium 2014, Proceedings.

Anstey, Nigel A.; "Vibroseis"; Prentice-Hall, Copyright 1991, p. 66.

Chen, Zhen, et al.; "Disturbance study of seismic vibrator reaction mass and piston"; PLoS ONE 14(12); Dec. 5, 2019.

Baeten, G., and Ziolkowski, A.; The Vibroseis Source; Elsevier, Copyright 1990, p. 47.

Sheriff, Robert E.; "Encyclopedic Dictionary of Applied Geophysics", Fourth Edition, Society of Exploration Geophysicists, copyright 1991.

* cited by examiner

SYSTEM AND METHOD TO TRANSFER INERTIAL MASS

INCORPORATION BY REFERENCE

U.S. provisional patent application Ser. No. 63/042,847, filed on Jun. 23, 2020, and Ser. No. 63/090,915, filed on Oct. 13, 2020, are incorporated in their entireties including drawings.

FIELD OF THE INVENTION

This application claims benefit of the filing dates of U.S. provisional patent application Ser. No. 63/042,847, filed pro se on Jun. 23, 2020, and Ser. No. 63/090,915, filed on Oct. 13, 2020, both by Dennis Keith Reust. The present invention relates to the arts of control systems and methods for seismic vibrators and vibrating machines, and especially to improvements to such systems.

BACKGROUND OF THE INVENTION

This invention applies to a servo controlled hydraulic vibrator apparatus used typically in the seismic surveying process. Such a vibrator system has an earth contacting baseplate which vibrates to provide energy for seismic exploration. The baseplate is driven by an actuator which is a double acting hydraulic cylinder. When actuator motion is essentially vertical, compressional waves are propagated in the earth, and when actuator motion is essentially horizontal, shear waves are propagated in the earth. The baseplate is rigidly attached to at least one piston rod which has an attached piston located between its two ends which extend from both ends of the hydraulic cylinder. The outside portion of the cylinder is heavy and serves as an inertial mass (reaction mass) for the piston to work against in its reciprocating motion. The actuator is controlled by a hydraulic servo valve which ports high pressure hydraulic fluid from a hydraulic power supply and exhausts fluid back to the power supply under control of an electrical signal. Of interest in this field of engineering are U.S. Pat. No. 3,059,483 (Frank Clynch and George J. Hanggi) which discloses a counter-rotating eccentric mass vibrator with adjustable eccentricity, U.S. Pat. No. 4,682,669 (Richard M. Weber) discloses a vehicle-mounted servo hydraulic seismic vibrator, and U.S. Pat. No. 4,450,928 (Richard M. Weber and John W. Bedenbender) discloses a servo hydraulic seismic vibrator which may be automatically re-configured for a longer range of cylinder stroke to produce more energy at low frequencies.

Since the 1950's sonic energy has been used for geophysical exploration. It can be compared to sonar or to ultrasound imaging. Energy from a source is reflected from various layers in the earth, and the reflected signals received over time are used to make maps of the under-surface geology. Dynamite was first used as the sonic energy source, and explosives are still used in many instances.

Seismic sensors known as geophones or accelerometers are used by the thousands or the hundreds of thousands to receive reflected signals from deep inside the earth. These sensors are spread over a large area of the ground and the location of each one is recorded. Super computers process these signals with human guidance to make 3-D geological maps.

In the late 1950's, the Continental Oil Company (later Conoco, then ConocoPhillips) in Ponca City, Okla., began to develop "The Vibroseis™ Method" of exploration which incorporates "seismic vibrators" rather than dynamite as the energy source. The vibrator places its baseplate (speaker cone) directly onto the ground and uses the carrier vehicle's weight to hold it firmly in place while emitting a recognizable signal which is typically a long chirp compared to radar's short chirps. Vibrators may operate singly or in combination with others. Vibrator designers typically limit a vibrator's peak force capability to about the combined weight of the vibrator and its supporting vehicle so it will remain coupled to the earth during operation. A very large portion of the vehicle's weight is typically applied to the baseplate during operation by a lift system which includes hydraulic cylinders which push upward on the vehicle frame and downward on the baseplate during operation. After operation, the lift cylinders raise the vibration machine so it can be moved. Between these lift cylinders and the baseplate are typically air springs which isolate the baseplate's dynamic vibration force from the vehicle while applying static force of the vehicle's weight to the baseplate. In parallel with the lift springs are chains, cables, or straps which protect the air springs from over-extension by supporting the vibration machine's weight when it is lifted. The total static force applied to the earth during operation is the sum of the vibration machine's weight and the portion of vehicle weight applied to the baseplate. This static force is called "Hold-down force". Vibrator dynamic force is normally controlled to be less than hold-down force, so that the net of the instantaneous static and dynamic forces does not reach zero, and the baseplate remains coupled to the earth. From another perspective, if the static force which the lift system applies to the baseplate is too large, vehicle wheels may be lifted off the ground, and this can result in vehicle instability. Vibrator carrier vehicles are typically designed to carry the vibrator near the center of gravity so maximal hold-down weight can be applied without lifting any wheel from the ground.

A seismic vibrator carries a heavy inertial mass "reaction mass" (RM) of several thousand pounds. A vibrator which includes an actuator, and a baseplate structure is hydraulically lowered to the ground when the vehicle is in place to operate. A diesel engine turns hydraulic pumps which supply fluid to the hydraulic lift system and to a servo valve which operates the vibrator. Under electrical control, the servo valve ports fluid into one chamber while exhausting fluid from the other chamber, of a large double-rod cylinder inside the reaction mass, urging the cylinder's piston to move in one direction and the reaction mass in the other direction. Then the servo valve reverses flow and reverses the motion of reaction mass and piston. Differential pressure across the piston multiplied the exposed area of one side of the piston equals the net force on the piston, and in opposite polarity on the reaction mass.

SUMMARY OF THE EXEMPLARY

Embodiments of the Invention

Earth vibrators, such as servo-hydraulic vibrators, are improved to emit more energy at very low frequencies by capturing mass from the vehicles which carry them, adding sufficient inertial mass to the reaction mass with minimal increase in vehicle and equipment weight while also avoiding increases to the servo-hydraulic vibrator's stroke length. In particular, improvements to servo-hydraulic vibrators, at low frequencies, will couple some mass from the carrier vehicle frame and its load using non-rigid coupling on demand using dampers connected between the reaction mass and the carrier vehicle's frame, with the added damping being commanded by a control system at very low frequencies of operation where the vibrator is otherwise unable to produce peak force equal to its hold-down force.

BRIEF DESCRIPTION OF THE DRAWINGS

The figures presented herein, when considered in light of this description, form a complete disclosure of one or more embodiments of the invention, wherein like reference numbers in the figures represent similar or same elements.

DETAILED DESCRIPTION OF ONE OR MORE EXEMPLARY EMBODIMENTS OF THE INVENTION

At least one objective of the present invention is to improve the capability of servo-hydraulic vibrators to produce vibrations at very low frequencies. At least one embodiment of the present invention provides a system and method to upgrade and improve existing servo-hydraulic vibrators according to the present invention.

Since about 1981, those in the industry have wanted to control the phase and amplitude of the force which the vibrator imparts to the earth. For practical reasons, this force has typically been estimated by making a weighted algebraic summation of the reaction mass force and the baseplate force. Each body's force is estimated by measuring its acceleration and multiplying the acceleration by the mass of that body. The sum of the two forces is referred to as "the weighted sum."

Newton's second law of motion teaches that force f is the product of mass m and acceleration a, e.g., $f=m \cdot a$. In order to increase a servo-hydraulic vibrator's output force at low frequencies where actuator stroke is a limiting factor, either its inertial mass or its acceleration must be increased. However, the present inventor has recognized that there are difficulties with increasing a servo-hydraulic vibrator's mass. If significant weight is added to the inertial mass (a.k.a., the "reaction mass" or RM), the carrier vehicle frame's width or length may have to be increased. For logistics purposes, increasing the size or gross vehicle weight (GVW) of a servo-hydraulic vibrator's carrier vehicle and its load is less than optimal.

The present inventor has also recognized that there are difficulties with increasing a servo-hydraulic vibrator's acceleration. In order to increase a servo-hydraulic vibrator's inertial mass' acceleration at very low frequencies, its cylinder stroke must be increased. However, a longer stroke degrades the servo-hydraulic vibrator's ability to produce high frequencies due to a larger trapped oil column in the cylinder, and may require a larger hydraulic pump, which, in turn, may require a larger engine, and thereby need a larger fuel tank. These can lead to an increase in the carrier vehicle's cost and weight (GVW), which is less than optimal.

Therefore, the present inventor has addressed this unmet but long-felt need in the art with the present invention as disclosed and illustrated by the one or more following example embodiments, which increase ground force amplitude at very low frequencies without significantly increasing the carrier vehicle's size or weight (GVW), and without the need for a larger hydraulic pump, engine or fuel tank, and without degrading high frequency servo-hydraulic vibrator performance.

Embodiments of the invention include changes to traditional vibrator control instruments, such as but not limited to upgrades to or addition of control programs executed by electronic controllers having microprocessors, sensors (electronic, hydraulic, and/or pneumatic), feedback paths (electronic, hydraulic, and/or pneumatic), and control signals (electronic, hydraulic, and/or pneumatic).

Useful Background Theory. Weight w is a force f whose vector opposes the force of gravity g. For example, weight w is the force which pushes upward on an object resting on a scale on Earth to keep it from free-falling toward the center of Earth. Place the same object on a scale on the Earth's moon where gravity is less than that of Earth, and its weight w (force) is less. Launch the same object into the Earth's air, and it's weightless.

Mass m is equal to force f divided by acceleration a, i.e., $m=f/a$. By Newton's Second Law of Motion, mass can be determined by measuring an object's acceleration when a known force is applied. With a given force, one can determine that the mass of the object has increased if a decrease in acceleration is observed. For example, imagine immersing a servo-hydraulic vibrator into a huge vat of viscous fluid such as honey. With given dynamic cylinder force (f=pressure*cylinder area), reaction mass (RM) velocity and acceleration will be reduced compared to operating in air. Therefore, by the equation above, the inertial mass increased. The vat of honey increased inertial mass by restraining (damping) the motion of the RM. One could say that (equivalent) mass was captured or borrowed from the honey. There are other and more practical methods of damping reaction mass motion.

System Approach of the Present Invention. Embodiments of the present invention improve the vibrator's ability to produce force at very low frequencies by capturing mass from the vehicle which carries it. Embodiments which add a multiple of its inertial mass to the reaction mass without adding much vehicle and equipment weight will upgrade the vibrator's ability to produce low frequency energy without the necessity of increasing the actuator's stroke length.

According to one aspect of the present invention, improvements to servo-hydraulic vibrators, at low frequencies, will couple (capture) some mass from the carrier vehicle frame and its load using non-rigid coupling when additional mass is needed. Hydraulic dampers will be connected between the reaction mass (RM) and the carrier vehicle's frame. These dampers can be of a wide array of constructions and configurations, and preferably their effect will adjustable so they can be strongly coupled when needed, and virtually inactive or decoupled when unneeded. As a first estimate, such damping will be applied only at very low frequencies where the vibrator is otherwise unable to produce peak force equal to its hold-weight. Embodiments preferably will avoid strong RM coupling at the frame resonance frequency, and dampers will be preferably made from double-rod hydraulic cylinders.

In at least one embodiment, two or more dampers will be placed with equal spacing about the reaction mass center of gravity. They will non-rigidly couple the reaction mass (RM) to the carrier vehicle's frame, and the strength of coupling will be adjusted in real-time. For practical purposes, the lift system may substitute for the vehicle frame since it is coupled to the frame by hydraulic cylinders. A double-rod hydraulic cylinder functions as a damper when its two fluid chambers are connected to one another with an intervening restriction. Hoses will connect the plurality of dampers such that fluid can freely flow between the upper ports of all dampers, and likewise between their lower ports. A variable fluid restriction (orifice) such as a proportional valve will be connected between the pluralities of upper and lower ports to adjust the amount of damping in real-time. A fixed orifice in parallel with the variable orifice can prevent the damping cylinders from locking. Damping will be applied only when needed to improve performance. Damping can be minimized when the lift system is moving or when the reaction mass is being centered before operation.

In this manner, embodiments of the present invention will significantly improve low frequency output at comparatively low cost and with only a modest increase in GVW. The more efficient vibrator won't need a larger pump(s) or engine because RM motion will be restrained, reducing the hydraulic system's flow requirement. Still further benefits of some embodiments may include reduced harmonic distortion because dampers act as low-pass filters, increased signal-to-noise ratios, and reduced baseplate rocking. Thermal energy dissipation, measuring ground force, and controlling the lift system will be design details to be attended to in each specific embodiment.

Ground Force Measurement. In presently available seismic vibrators on the market, a weighted sum method adds the actuator force to the baseplate force. This weighted sum estimates dynamic ground force and is used to measure and control the vibrator's phase and amplitude. Actuator force (reaction mass force) is measured by multiplying reaction mass acceleration from a sensor by the weight of the reaction mass, and baseplate force is measured by multiplying baseplate acceleration from a sensor by the weight of the baseplate structure. To obtain a realistic estimate of ground force produced by vibrators improved according to the present invention, a third term "damper force" will be added to the traditional weighted sum process used in traditional servo-hydraulic vibrators. The third term will be the force applied by the new (added) dampers because damper force is applied to the reaction mass, and thus to the earth's surface.

In one embodiment, adding the damper force from hydraulic dampers to the legacy weighted sum accomplishes this function. Damper force can be determining using the equation:

$$f=pA \qquad \text{Eq. 1}$$

where f represents force, p represents pressure, and A represents surface area on which the pressure acts. These methods can be implemented using sensors, electronic circuits, a microprocessor executing a code-controlled method, mechanical components, hydraulic components, or a combination thereof.

Measuring Hydraulic Damper Force. "Damper force" is the product of differential pressure across hydraulic dampers and the piston area of damping cylinders which is exposed to the pressurized fluid. More specifically, the product of fluid pressure on one side of a cylinder piston multiplied by the piston area exposed to the fluid is the force urging the piston to move away from the pressurized fluid, and the product of fluid pressure on the opposite side of the cylinder piston multiplied by the piston area exposed to the fluid is the force urging the piston to move in the opposite direction. The difference in forces on the two sides of the piston is the net force on the cylinder piston. By Newton's third law of motion, equal and opposite forces are applied to the damper piston and to its cylinder housing. Sensors may be used to measure pressure, and any suitable means such as electronic circuits or digital processing systems may calculate differential pressure and calculate the product of differential pressure and exposed piston area.

Lift System Control. A seismic vibrator applies peak force in both upward and downward directions, and conventional wisdom says that in order to keep its baseplate on the ground during operation, the total force which the baseplate applies to the ground should always exceed zero. Static force which the baseplate applies to the ground is the sum of the vibrator actuator's weight, and the baseplate structure's weight, and a portion of the carrier vehicle's weight which is applied to the baseplate through at least two lift cylinders which are typically separated from the baseplate by multiple air springs. Pressure applied to top surfaces of the multiple lift cylinder pistons forces the baseplate downward into pressurized contact with the earth. For embodiments in which the dampers are connected to the lift systems of the improved servo-hydraulic vibrator, lift cylinders will bear both the static force which they apply to the baseplate and dynamic force from the vehicle frame because it is compliantly coupled to the reaction mass. The sum of static and dynamic forces applied to the lift cylinders is also applied to the vehicle frame. In addition, dynamic force applied to the frame can cause vehicle wheels to bounce off the ground if dynamic force exceeds the portion of vehicle weight not applied to the baseplate. This can cause vehicle instability and operator discomfort.

To avoid excessive force on the lift cylinders and frame, and to keep vehicle wheels on the ground, lift cylinder force may be varied with frequency under command of a controller. At very low frequencies when dampers are engaged lift system pressure will be regulated to a lower than usual value such that the sum of static and dynamic forces on the lift cylinders and frame will not exceed desired maximums, and to leave sufficient vehicle weight on the wheels to keep them on the ground. Lift cylinder pressure is traditionally controlled by a pressure reducing valve. On prior technology vibrators, the desired lift pressure is set by mechanical adjustment. On vibrators according to this invention, electrically controlled pressure reducing valves or proportional valves with pressure feedback may be used, and lift pressure may be controlled in real-time according to signals from a vibrator controller.

Optimum stroke and effect of the baseplate isolation air springs may be maintained by raising and lowering pressure in the air springs in approximate proportion to lift cylinder pressure. One or more electrically controlled air pressure regulators under command of a vibrator controller can keep the isolation air springs operating effectively. The spring-mass resonance associated with the isolation air springs can be controlled by shock absorbers or adjustable hydraulic dampers.

Thermal Energy. If damping orifices are either completely closed or completely open, then the hydraulic dampers will generate almost no thermal energy. So, maximum energy dissipation will be somewhere in between the two extremes of completely closed and completely open damping orifices. In some embodiments, a control portion of the improvement to the servo-hydraulic vibrator will operate with nearly total closure of the damping orifices when dampers are needed, and then will open the damping orifices to the essentially their maximum in a minimum time required to prevent a perturbation in vibrator control.

In some embodiments where hydraulic dampers could dissipate enough thermal energy to over-hear hydraulic fluid, rather than having hydraulic fluid go back-and-forth between damping cylinder chambers, the design will let the damper cylinder chambers exhaust heated fluid into a reservoir through orifices, and to re-fill from the servo-hydraulic vibrator vibrator's low-pressure circuit through check valves.

Shear-wave vibrators and electromagnetic vibrators will, in some embodiments, use the similar embodiment technology of transferring inertial mass to achieve similar objectives and improvements, such as increasing low frequency output capability and reduction of harmonic distortion and.

Damper Attachment to the Frame. In embodiments in which the damping cylinders are attached to both the reaction mass (RM) and the vehicle frame, their maximum stroke will preferably equal or exceed the sum of maximum allowable lift stroke and actuator stroke. The total cylinder length when extended will be about twice that total stroke length, and this can be prohibitive in some embodiments, which is why attaching to a lift system is an attractive embodiment as well. Other alternatives may be in order for some embodiments. For example, the frame attachment can be through a locking linear slide which is released during baseplate positioning motion, and locked during vibrator operation. Then, the lift cylinder stroke can be reduced to actuator stroke and the anticipated lift cylinder movement during sweeps.

Alternatives to Damping Cylinders. In some embodiments, instead of or in conjunction with the damping cylinders, a variable friction slide may be used, such as slides similar to what is sometimes mentioned as a potential damper attachment. Such embodiments may be less expensive, and may need additional protection from the weather and environmental elements. In at least one embodiment, such a slide will resemble the "ways" on an engine lathe with a bellows covering, and it may have adjustable friction clamps actuated by air or hydraulic cylinders. In such embodiments, load cells may be used to measure damping force on one end of each damping element, and summing the load cell outputs. The result can be added by the improved vibrator's control system to the weighted sum. In still other embodiments, telescoping cylinders may be appropriate.

Further Embodiment Variations. The following additional or alternative embodiment elements are possible in some implementations within the scope of the present invention:

(a) Replace the hydraulic dampers with pneumatic dampers or using both.
(b) Add springs to the dampers to form a mass-spring-damper system. The damping coefficient and spring constant can be adjustable in real-time if hydraulic dampers and pairs of air springs are employed which resist mass motion in both directions from center. This may improve efficiency since a spring stores and returns energy. Also, springs self-decouple above their resonance frequencies. However, springs will change the vibrator's open-loop amplitude and phase response for better or worse, and make conception and modelling more complicated.
(c) Use a servo valve to control the lift system, and directly drive the lift system with a sinusoid modified to account for different piston areas on each side. This may have some benefit near and below the air spring/mass resonance frequency of approximately 1.5 Hz to 3.5 Hz.

Early Prototype Testing and Validation. A first prototype has been constructed, and testing has validated some of the foregoing operation and benefit disclosure. Initial testing has been performed using load cells to obtain some preliminary quantitative results at specific frequencies and sweeping across a vibrational range of about 0.1 to 200 Hz.

Figure 1:
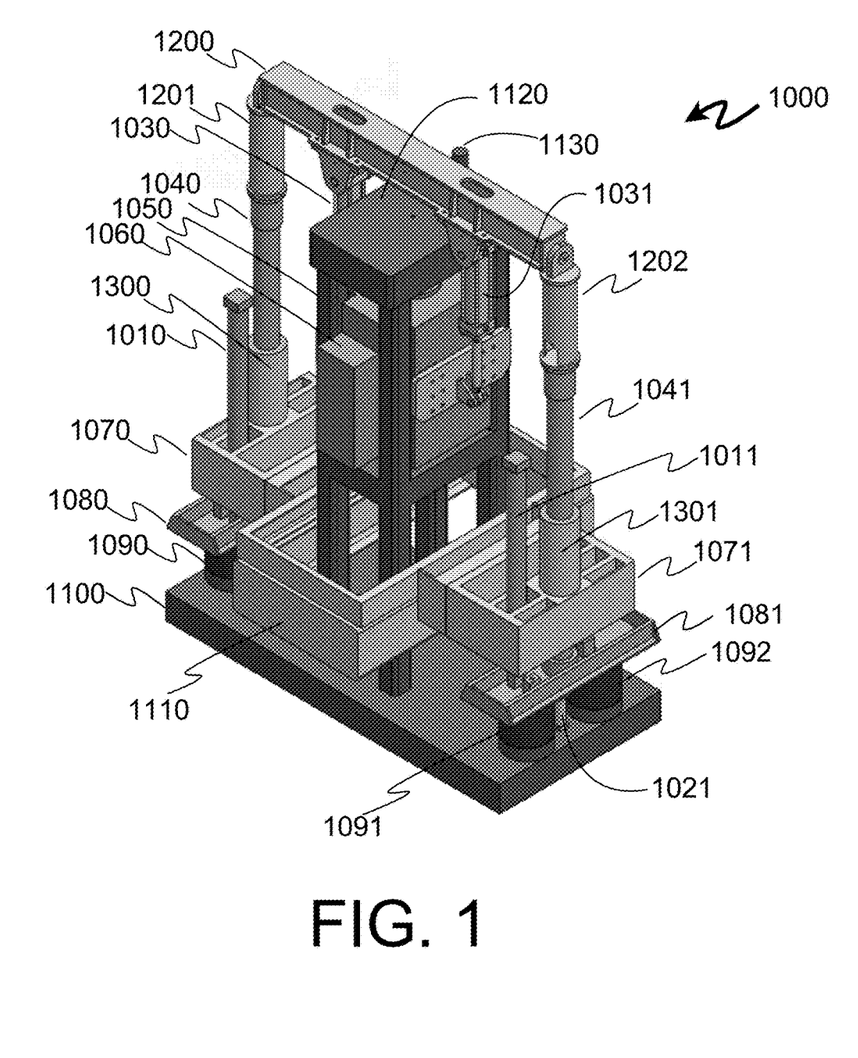
FIG. 1 illustrates an exemplary prototype embodiment including modifications, additions and changes to a compressional wave Hemi-44 servo-hydraulic vibrator according to the present invention.
Figure 2:
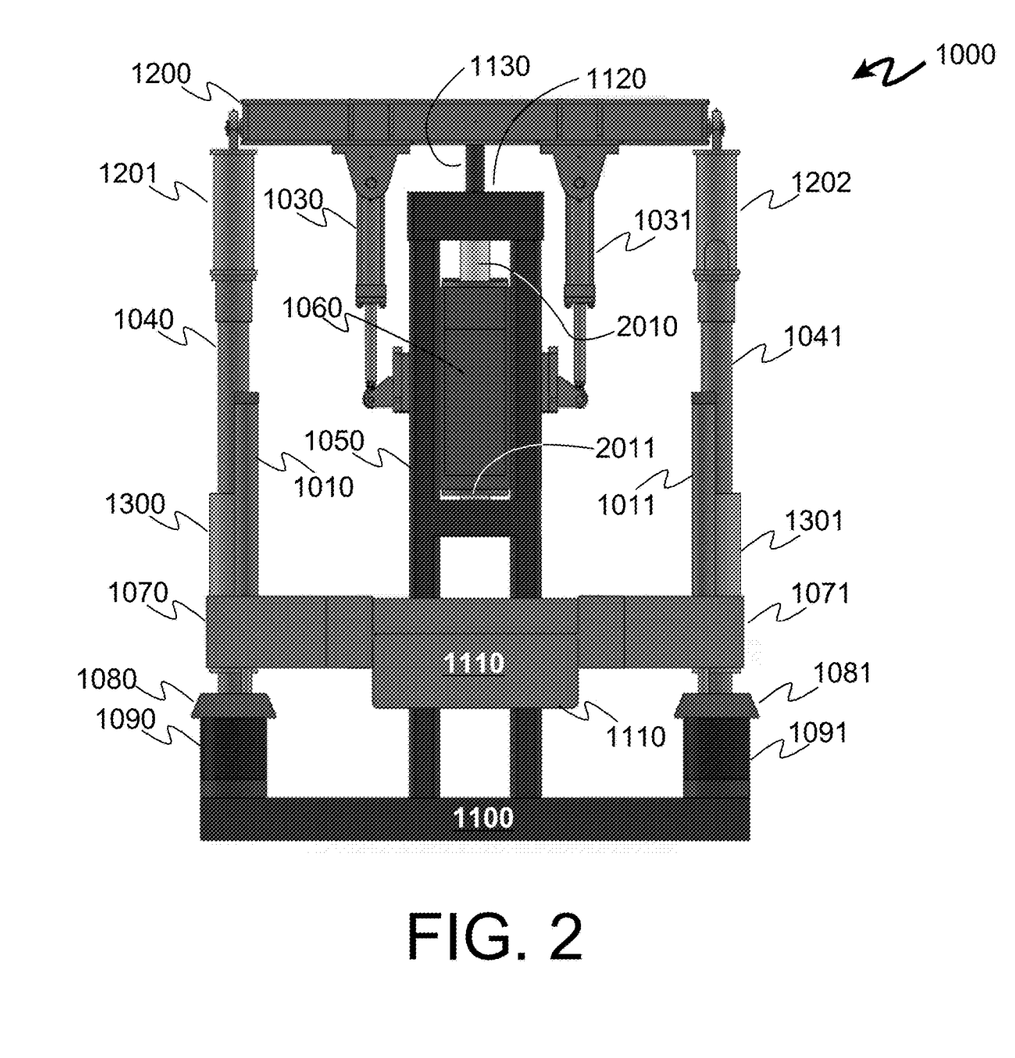
FIG. 2 depicts a front side view of the embodiment of FIG. 1.
Figure 3:
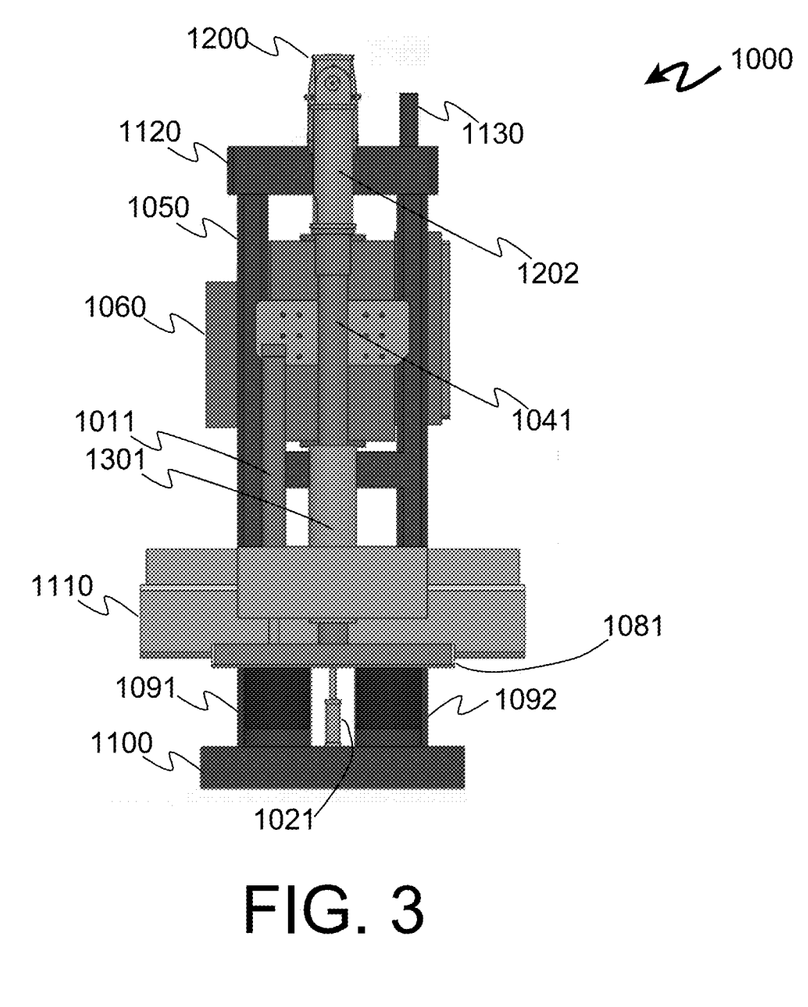
FIG. 3 shows a right side view of the embodiment of FIG. 1.

FIGS. 1, 2 and 3 illustrate different views of an exemplary prototype 1000 comprising modifications, additions and improvements according to the present invention to a Hemi-44 servo-hydraulic vibrator made by Heaviquip® Engineering and Manufacturing Company whose product line was subsequently sold to Industrial Vehicles International Inc.® of Tulsa, Okla. For reference, a Hemi-44 servo-hydraulic vibrator produces a maximum 43,600 pounds of peak force with a hold-down weight of 44,000 pounds, and has a baseplate area of 4,000 square inches with a baseplate weight of 3,950 pounds. The reaction mass weight of a Hemi-44 modified according to the present invention is 6,250 pounds, and the lift system stroke is 26 inches. Other vibrators, such as a Hemi 50 or Hemi 60, both also available from Industrial Vehicles International Inc.®, as well as vibrators from other manufacturers can be modified according to the present invention. As such, the following prototype is for illustrative purposes and does not represent a limitation to other embodiments of the present invention. With reference to FIG. 1, which provides a perspective view, a new damper mount 1200, 1201, 1202 attaches new (added) hydraulic damping cylinders 1030, 1031 to the vibrator's existing lift system at the tops of the existing lift columns 1040, 1041. The added (new) pair of hydraulic dampers (double-rod cylinders) 1030, 1031 connects the reaction mass 1060 to the existing lift system 1040, 1041, 1080, 1081, which is supported by portions of the vehicle frame 1070, 1071, 1110.

Continuing with reference to FIG. 1, a pair of existing lift cylinders 1010, 1011 lift the vibrator to allow the vehicle to move, and press it hard against the ground during seismic surveying operation. Existing isolation air springs 1090, 1091, 1092, 1093 (not shown, positioned in corner diagonal from 1091) isolate the baseplate's vibration from the vehicle frame. Optional new dampers 1020 (obscured from view in FIG. 1), 1021 are mounted in parallel with the isolation air springs 1090, 1091, 1092, 1093, such as between each pair of isolation air springs, to dampen their natural spring-mass resonance. Typical cables, hydraulic hoses, and valves are not shown to reduce complexity of the illustration.

Existing guide columns 1040, 1041 fasten to presser feet 1080, 1081 to keep the baseplate 1100 in the correct lateral position. They slide up and down through bushings 1300, 1301 which are attached to the portions of the vehicle frame 1070, 1071. The existing stilt structure 1050 and top cross 1120 attach the actuator, which comprises the reaction mass with extension 1060 and the actuator piston rod, to the baseplate 1100. The already-mentioned existing presser feet 1080, 1081 are guided by the existing guide columns, are raised and lowered by the lift cylinders, to apply a large percentage of the vehicle's weight to the ground via the air springs 1090, 1091, 1092 and 1093 (obscured from view in FIG. 1) for vibration operation. The already-mentioned existing air springs 1090, 1091, 1092 and 1093 (obscured from view in FIG. 1) (a.k.a. airbags) isolate the baseplate's vibration from the vehicle while supporting the majority of the vehicle's weight during vibration operation. Sensor 1130 monitors reaction mass position along its range of motion.

FIG. 2 provides a front view of the improved vibrator system 1000 as discussed with respect to FIG. 1. Particularly well visible in this front view are the actuator's top 2010 and bottom 2011 piston rods. A rear view of the improved vibrator system 1000 would be substantially a mirror image of the front view shown in FIG. 2 except for an unobstructed view of the actuating piston.

FIG. 3 provides a right side view of the improved vibrator system 1000 as discussed with respect to FIGS. 1 and 2, with an improved view of the added (new) damper 1021 which was obscured from view in FIG. 1), and its mate 1020 (obstructed from view in FIG. 3), mounted in parallel with the isolation air springs 1090, 1091, 1092, 1093 (1090 and 1093 are obscured from view in FIG. 3). A left side view of the improved vibrator system 1000 would be substantially a mirror image of the right side view shown in FIG. 3.

Figure 4:
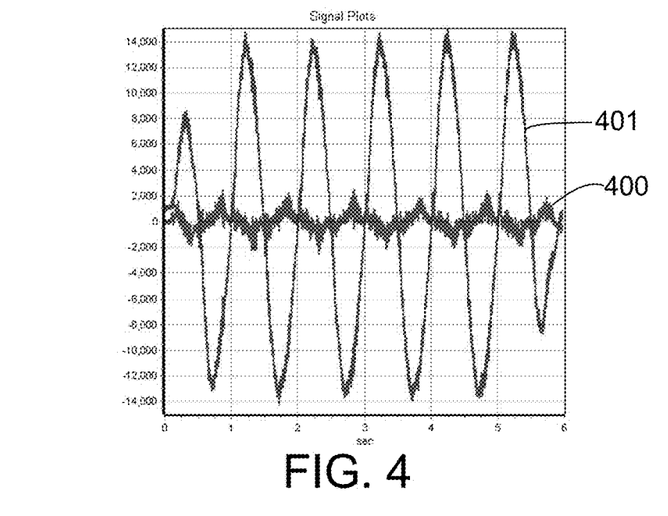
FIG. 4 provides a plot of maximum ground force signals at 1 Hz with prior technology (small signal) and using the present invention (large signal).
Figure 5:
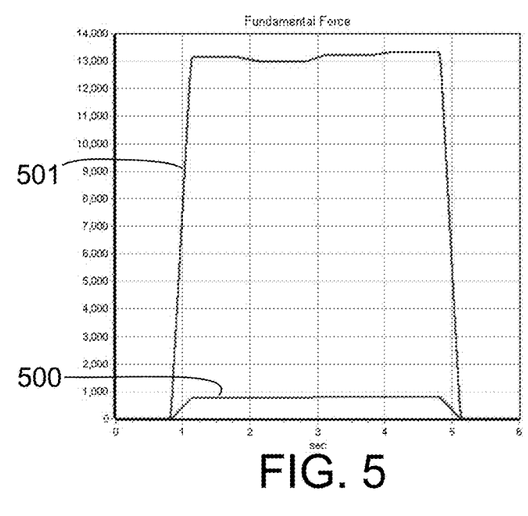
FIG. 5 provides a peak fundamental force output measurement corresponding to signals of FIG. 4 where the lower line represents prior technology and the higher line represents performance with technology of the present invention.

FIGS. 4, and 5 illustrate experimental data collected from an early prototype of an improved servo-hydraulic vibrator according to the present invention. This actual test data shows more than 13,000 pounds of peak fundamental force at a produced frequency of 1 Hz. To the best of the present inventor's knowledge, this performance at very low frequencies surpasses any production seismic vibrator in the world at this time.

Referring to FIG. 4, a vibrator operates with maximum practical effort at 1 Hz for 6 seconds. The amplitude tapers up at the beginning and down at the end of operation. With existing (unimproved) technology, its maximum practical ground force output 400 is relatively weak and distorted, but after modification according to the present invention, its maximum practical output force 401 is several multiples of its prior capability, and exhibits less distortion. (The phase change is arbitrary for display purposes.) FIG. 5 shows the peak fundamental force exerted by the existing (unimproved) technology 500 and as exerted by improved vibrating systems 501 according to the present invention during the 1 Hz operation shown in FIG. 4. The top plot line in FIG. 5, represents the maximum practical peak fundamental force of the improved vibrating system at 1 Hz, whereas the lower plot line represents the maximum practical peak force outputs for existing technology (unimproved) vibrating systems, clearly showing that 13,000 pounds of peak fundamental force output at 1 Hz exceeds the approximately 920-pound peak fundamental force output of the unmodified system.

As a vibrator is passing through a certain frequency range, (not shown) of about 1.5 Hz to 3.5 Hz which can vary by vibrator type and other factors, a resonance can occur and either enhance or detract from the vibrator's output. This spring-mass resonance involves the baseplate isolation air springs and the vehicle's mass. The optional air spring dampers according to the present invention can be used to damp the resonance. The amount of damping can optionally be adjusted from a maximum to a minimum near zero on command in at least one embodiment.

Figure 6:
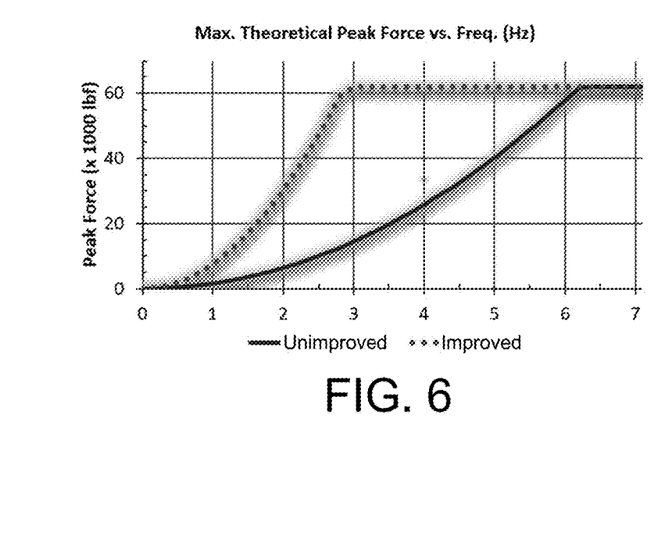
FIG. 6 illustrates improvement in a vibrators capability after incorporating the improvements according to the invention, wherein the area between the two curves represents added output capability.

FIG. 6 shows a calculated improvement in a given seismic vibrator's ability to output force with frequency after being retrofitted with the improvement technology described according to the present invention. The area between the curves represents added potential capability.

Control System. An electronic control system for seismic vibrators may be designed or modified to effectively use the new technology. Electronic circuits and microprocessor code may be incorporated into a single control unit, or may distributed in two or more electronic units. A required feature is the ability to measure or estimate the vibrator output's amplitude and phase so that it can be controlled suitably for its role in seismic surveying. Sensors for measuring properties related to output amplitude and phase may include any useful combination of accelerometers, pressure transducers and load cells. In one embodiment of the invention, the sum of reaction mass force, baseplate force, and reaction mass damper force provides a reasonable estimate of vibrator ground force. The ground force summation may be done by analog or digital circuits which may include operational amplifiers, analog-to-digital converters, one or more microprocessors, and coded instructions.

Inputs to a control system to optimize the improved vibrator's performance may include one or more inputs to measure or communicate reaction mass damper force from pressure sensors, load cells, or external amplifying and/or summing circuitry and an input to measure or communicate hold-down pressure in lift system cylinders.

Outputs from a control system to optimize the improved vibrator's performance may include any combination of output which represents the vibrator's instantaneous operating frequency or frequency range, an output which controls reaction mass damping, an output which controls isolation air spring damping, an output which controls hold-down pressure to lift cylinders, and an output which controls isolation air spring gas pressure.

The control system portion of embodiments of the present invention may include one or more microprocessors accompanied by, sometimes, specialized co-processors or accelerators, such as digital signal processors, and by suitable computer readable memory devices (RAM, ROM, removable memory cards, etc.). Depending on the computing platform, one or more network interfaces may be provided, as well as specialty interfaces for specific applications. If the controller computing platform is intended to interact with human users, it is provided with one or more user interface devices, such as display(s), keyboards, pointing devices, speakers, etc. And, each computing platform requires one or more power supplies (battery, etc.). Certain embodiments utilizing a microprocessor executing a logical process may also be realized through customized electronic circuitry performing the same logical process(es).

Conclusion. A seismic vibrator's output signal while operating at very low frequencies can be improved in amplitude and fidelity by increasing the inertial mass (reaction mass) of its actuator. If sufficient mass is added, it may not be necessary or desirable to increase its maximum actuator stroke length. Mass can be added to the actuator on command by appropriating a portion of the carrier vehicle's mass and effectively adding it to the inertial mass through non-rigid and adjustable coupling. This coupling can be accomplished with 2 or more hydraulic dampers. One end of each damper dampers can be connected to the reaction mass, and the other end can be connected to the lift system components which are, in turn, connected to the vehicle frame, or directly to the vehicle frame itself. A seismic vibrator modified according to this invention may be able to produce several multiples of its previous output force capability, and may have significantly less distortion in its output signal.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The foregoing example embodiments do not define the extent or scope of the present invention, but instead are provided as illustrations of how to make and use at least one embodiment of the invention.

I claim:

1. An improved vibroseis source system, the improvement comprising:
in a vibroseis source system having a base plate component, two or more vertical Lift Columns extending between a vehicle and the base plate component, and a reaction mass component which is mechanically isolated from the base plate component via an actuating piston internal to the reaction mass component, the actuating piston configured to produce vertical displacement of the reaction mass component when the base plate component is lowered and coupled against a surface of earth via the two or more lift columns during vibroseis source operation:
   a damper mount member extending laterally from at least a first of the two or more lift columns of the vibroseis source system to at least a second of the two or more lift columns; and
   one or more hydraulic dampers, each damper having at least one piston rod connection and a cylinder connection, each damper being directly mechanically connected between the reaction mass component and the damper mount member using the at least one piston rod connection and the cylinder connection and providing non-rigid mechanical coupling between the reaction mass component and the vehicle.

2. The improved vibroseis source system as set forth in claim 1 wherein the one or more hydraulic dampers are further configured to selectively provide non-rigid coupling between the reaction mass component on the vibroseis source system and the damper mount member.

3. The improved vibroseis source system as set forth in claim 2 further comprising a control system configured to, during a period of low frequency vibration output, engage the one or more hydraulic dampers.

4. The improved vibroseis source system as set forth in claim 1 wherein the one or more hydraulic dampers are further configured to provide continuous non-rigid coupling between the reaction mass component on the earth vibrator system and the damper mount member independent of frequency of vibration output.

5. The improved vibroseis source system as set forth in claim 1 wherein the vibroseis source system comprises a servo-hydraulic vibrator.

6. The improved vibroseis source system as set forth in claim 1 wherein the vibroseis source system comprises a shear-wave vibrator.

7. The improved vibroseis source system as set forth in claim 1 wherein the vibroseis source system comprises an electromagnetic vibrator.

8. The improved vibroseis source system as set forth in claim 1 wherein improvements to the vibroseis source system avoid adding significant weight to the vehicle.

9. The improved vibroseis source system as set forth in claim 1 wherein improvements to the vibroseis source system avoid increasing a maximum stroke length of the earth vibrator system.

10. The improved vibroseis source system as set forth in claim 3 wherein the low frequency comprises one or more frequencies selected from the group consisting of more than 0 Hertz and up to and including 7 Hertz.

11. The improved vibroseis source system as set forth in claim 1 wherein the increased force output comprises absolute peak force.

12. The improved vibroseis source system as set forth in claim 1 wherein the increased force output comprises fundamental force.

13. The improved vibroseis source system as set forth in claim 1 wherein the one or more hydraulic dampers comprises a double-rod hydraulic cylinder.

14. The improved vibroseis source system as set forth in claim 1 wherein the one or more hydraulic dampers comprises a pneumatic cylinder.

15. The improved vibroseis source system as set forth in claim 1 further comprising one or more springs associated with the one or more hydraulic dampers configured to resist reaction mass motion in two directions.

16. The improved vibroseis source system as set forth in claim 1 further comprising a servo valve configured to control a lift system of the vibroseis source system by directly driving the lift system with a sinusoid signal modified to account for different piston areas on each side.

17. An improved vibroseis source control system, the improvement comprising:
in a vibroseis source system having a base plate component, two or more vertical lift columns extending between a vehicle and the base plate component, and a reaction mass component which is mechanically isolated from the base plate component via an actuating piston internal to the reaction mass component, the actuating piston configured to produce vertical displacement of the reaction mass component when the base plate component is lowered and coupled against a surface of earth via the two or more lift columns during vibroseis source operation, one or more electronic circuits configured to:
   selectively engage one or more hydraulic dampers, each hydraulic damper having at least one piston rod connection and a cylinder connection, each hydraulic damper being directly mechanically connected between the reaction mass component and the a damper mount member extending laterally from at least the first lift column of the vibroseis source system to at least the second lift column, to provide non-rigid mechanical coupling between the reaction mass component and the damper mount member;

wherein the selective engaging is commanded by the one or more electronic circuits during a period of selected frequency vibration output.

18. The improved system as set forth in claim 17 wherein the one or more electronic circuits comprise one or more analog control circuits.

19. The improved system as set forth in claim 17 wherein the one or more electronic circuits comprise one or more digital control circuits.

20. The improved system as set forth in claim 17 wherein the one or more electronic circuits are further configured to estimate vibrator output force by summing at least reaction mass force, baseplate force, and reaction mass damper force.

21. The improved system as set forth in claim 20 wherein the estimating vibrator output force further comprises measuring at least reaction mass damper force, reaction mass acceleration, and baseplate acceleration.

22. The improved system as set forth in claim 20 wherein the estimating vibrator output force further comprises receiving from one or more pressure transducers and from one or more accelerometers the measurements of reaction mass damper force, reaction mass acceleration, and baseplate acceleration.

23. The improved system as set forth in claim 17 further comprising an output to control reaction mass damping.

24. The improved system as set forth in claim 17 further comprising an output to control at least one air spring.

25. The improved system as set forth in claim 24 wherein the output to control at least one air spring is configured to control at least one air spring gas pressure.

26. The improved system as set forth in claim 17 further comprising an output to control hydraulic pressure in lift cylinders which provide hold-down force.

* * * * *